(12) United States Patent  
Ariie et al.

(10) Patent No.: US 9,745,902 B2  
(45) Date of Patent: Aug. 29, 2017

(54) VEHICLE CONTROL APPARATUS AND VEHICLE CONTROL METHOD

(71) Applicants: Takahiro Ariie, Nisshin (JP); Akito Onishi, Nagoya (JP)

(72) Inventors: Takahiro Ariie, Nisshin (JP); Akito Onishi, Nagoya (JP)

(73) Assignees: Aisan Kogyo Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/277,950

(22) Filed: May 15, 2014

(65) Prior Publication Data

US 2014/0338645 A1 Nov. 20, 2014

(30) Foreign Application Priority Data

May 16, 2013 (JP) ................................. 2013-104395

(51) Int. Cl.
*F02B 13/00* (2006.01)
*F02D 19/06* (2006.01)
(Continued)

(52) U.S. Cl.
CPC ..... *F02D 19/0613* (2013.01); *F02D 19/0615* (2013.01); *F02D 19/0623* (2013.01);
(Continued)

(58) Field of Classification Search
CPC ...... F02D 41/0025; F02D 19/06; F02D 19/08; F02B 3/06; F02M 1/00
(Continued)

(56) References Cited

U.S. PATENT DOCUMENTS 4,132,237 A * 1/1979 Kennedy ................. F16K 17/22
137/75
6,427,670 B2 8/2002 Goto
(Continued)

FOREIGN PATENT DOCUMENTS

CN 102822478 A 12/2012
EP 2 538 058 A1 12/2012
(Continued)

OTHER PUBLICATIONS

Japanese Office Action for Application No. 2013-104395, mailed Jun. 27, 2016 and English language translation (6 pgs total).

*Primary Examiner* — Jacob Amick
*Assistant Examiner* — Charles Brauch
(74) *Attorney, Agent, or Firm* — Patterson Thuente Pedersen, P.A.

(57) ABSTRACT

If the pressure in a supply passage drops at a speed greater than a first determination speed in a state in which a first mode for supplying gas fuel to an internal combustion engine is selected, a control apparatus inhibits selection of the first mode. Then, the control apparatus switches from the first mode to a second mode, in energy other than gas fuel is used. In this state, if the pressure in the supply passage drops at a speed greater than a second determination speed, the control apparatus maintains the state in which the second mode is selected. If the pressure in the supply passage drops at a speed lower than the second determination speed, the control apparatus cancels the inhibition of selection of the first mode when it is detected that a manual on-off valve is opened.

7 Claims, 6 Drawing Sheets (51) Int. Cl.
*F02D 41/22* (2006.01)
*F02M 1/00* (2006.01)
*F02B 3/06* (2006.01)
*F02D 19/08* (2006.01)
*F02D 41/00* (2006.01)

(52) U.S. Cl.
CPC ..... *F02D 19/0628* (2013.01); *F02D 19/0647* (2013.01); *F02D 41/0027* (2013.01); *F02D 41/22* (2013.01); *F02B 3/06* (2013.01); *F02D 19/06* (2013.01); *F02D 19/08* (2013.01); *F02D 41/0025* (2013.01); *F02D 2041/225* (2013.01); *F02M 1/00* (2013.01); *Y02T 10/36* (2013.01); *Y02T 10/40* (2013.01)

(58) Field of Classification Search
USPC .......................................................... 123/575
See application file for complete search history.

(56) References Cited

U.S. PATENT DOCUMENTS

| | | | |
|---|---|---|---|
| 2008/0119982 A1* | 5/2008 | Yamada | 701/35 |
| 2009/0070008 A1* | 3/2009 | Batenburg et al. | 701/103 |
| 2013/0000752 A1 | 1/2013 | Saito et al. | |
| 2014/0048047 A1 | 2/2014 | Komoda et al. | |

FOREIGN PATENT DOCUMENTS

| | | |
|---|---|---|
| JP | 56-70138 | 6/1981 |
| JP | H 09-242614 A | 9/1997 |
| JP | 2000303909 | 10/2000 |
| JP | 2001-193511 A | 7/2001 |
| JP | 2001304000 | 10/2001 |
| JP | 2011196258 A | 10/2011 |
| JP | 2012-233418 A | 11/2012 |

\* cited by examiner

VEHICLE CONTROL APPARATUS AND VEHICLE CONTROL METHOD

RELATED APPLICATION

This application claims benefit of priority from Japanese Patent Application No. 2013-104395, filed May 16, 2013, said application being hereby fully incorporated herein by reference.

BACKGROUND OF THE INVENTION

The present invention relates to a vehicle control apparatus and a vehicle control method that are applicable to a vehicle having a first mode, in which gas fuel is supplied to an internal combustion engine to drive the vehicle, and a second mode, in which the vehicle is driven by energy other than gas fuel.

Japanese Laid-Open Patent Publication No. 2000-303909 discloses a gas fuel supply device that includes a supply passage for supplying gas fuel to injectors. The supply passage has a manual on-off valve, a first shutoff valve, and a second shutoff valve. The manual on-off valve is manually opened or closed by the user. The first shutoff valve is arranged upstream of the manual on-off valve. The second shutoff valve is arranged downstream of the manual on-off valve. The shutoff valves are controlled to open and close through control by a control apparatus.

When the manual on-off valve and the shutoff valves are open, gas fuel is supplied to the supply passage from a reservoir tank. Gas fuel is supplied to the injectors through the supply passage.

When a leakage determination process for determining whether gas fuel is leaking from the supply passage is performed, injection of gas fuel from the injectors is inhibited, and the shutoff valves are closed. Then, pressure fluctuation in the section of the supply passage between the closed first and second shutoff valves is monitored. If pressure drop is not detected, it is determined that gas fuel is not leaking to the outside from the section of the supply passage. When a pressure drop is detected in the supply passage section between the first and second shutoff valves, it is determined that gas fuel is leaking to the outside from the supply passage.

Known vehicles that can be driven by an engine using gas fuel include a vehicle that mounts a bi-fuel internal combustion engine, which can be driven not only by gas fuel, but also by liquid fuel. In a vehicle that can be drive by using energy other than gas fuel, it is preferable to quickly switch from the gas fuel-powered vehicle traveling to the driving by the other energy when gas fuel is leaking to the outside from the gas fuel supply passage.

As a method for detecting gas fuel leakage from the gas fuel supply passage in such a vehicle, the leakage determination process disclosed in the above described publication may be used. However, since the described leakage determination process is performed after injection of gas fuel from the injectors is inhibited, the leakage determination process can be performed on limited occasions. Particularly, if gas fuel starts leaking to the outside from the supply passage during the gas fuel-powered vehicle traveling, the detection of the leakage will be delayed. This may cause a delay in switching from the gas fuel-powered vehicle traveling to the vehicle traveling by using the energy other than gas fuel.

SUMMARY OF THE INVENTION

Accordingly, it is an objective of the present invention to provide a vehicle control apparatus and a vehicle control method that are capable of promptly inhibiting gas fuel-powered engine operation when there is leakage of gas fuel to the outside from a supply passage for supplying fuel gas.

To achieve the foregoing objective and in accordance with a first aspect of the present invention, a vehicle control apparatus is provided that is applicable to a vehicle having a first mode, in which gas fuel is supplied to an internal combustion engine to drive the vehicle, and a second mode, in which the vehicle is driven by energy other than gas fuel. The vehicle control apparatus is configured, when the first mode is selected, to supply gas fuel to the engine via a supply passage for gas fuel, in which a manual on-off valve is arranged. If a pressure in the supply passage drops at a speed greater than a first determination speed in a state in which the first mode is selected, the control apparatus inhibits selection of the first mode and switches from the first mode to the second mode. If the pressure in the supply passage drops at a speed greater than a second determination speed in a state in which the second mode is selected due to inhibition of selection of the first mode, the control apparatus maintains the state in which the second mode is selected. If the pressure in the supply passage drops at a speed lower than the second determination speed in a state in which the second mode is selected due to inhibition of selection of the first mode, the control apparatus cancels the inhibition of selection of the first mode when it is detected that the manual on-off valve is opened.

In accordance with a second aspect of the present invention, a vehicle control method is provided that is applicable to a vehicle having a first mode, in which gas fuel is supplied to an internal combustion engine to drive the vehicle, and a second mode, in which the vehicle is driven by energy other than gas fuel, wherein the vehicle control method is configured, when the first mode is selected, to supply gas fuel to the engine via a supply passage. The method includes: a step in which, if a pressure in the supply passage drops at a speed greater than a first determination speed in a state in which the first mode is selected, selection of the first mode is inhibited and the first mode is switched to the second mode; a step in which, if the pressure in the supply passage drops at a speed greater than a second determination speed in a state in which the second mode is selected due to inhibition of selection of the first mode, the state in which the second mode is selected is maintained, and a step in which, if the pressure in the supply passage drops at a speed lower than the second determination speed in a state in which the second mode is selected due to inhibition of selection of the first mode, the inhibition of selection of the first mode is canceled when it is detected that a manual on-off valve provided in the supply passage is opened.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle control apparatus and a vehicle control method according to one embodiment will now be described with reference to FIGS. 1 to 8. The apparatus and method are applicable to a vehicle having a first mode, in which fuel gas is supplied to an internal combustion engine to drive the vehicle, and a second mode, in which the vehicle is driven by energy other than fuel gas.

Figure 1:
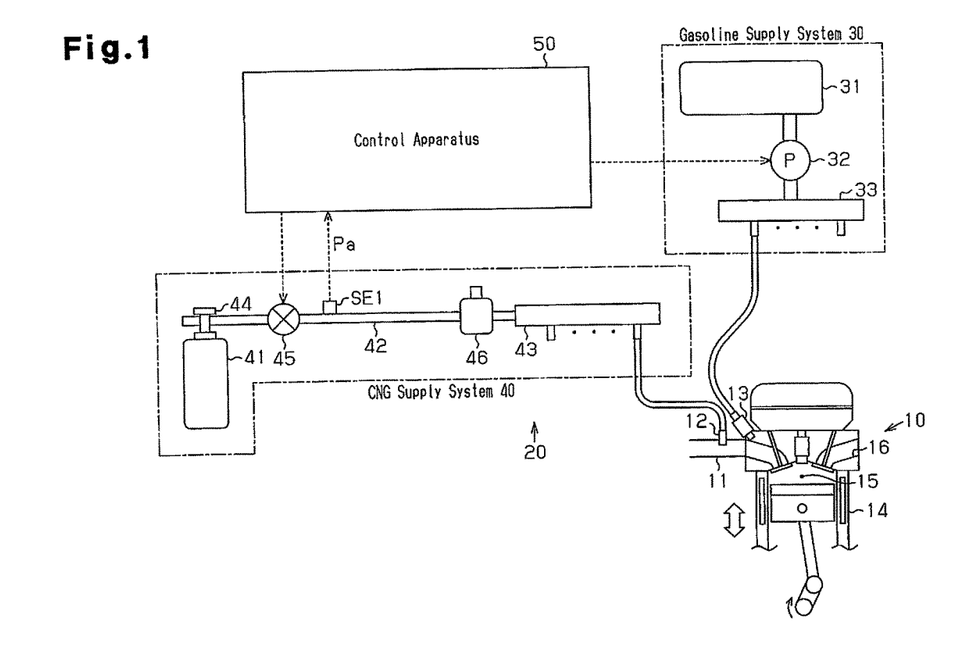
FIG. 1 is a schematic diagram showing a vehicle control apparatus according to one embodiment, a fuel supply device, and an internal combustion engine.

As shown in FIG. 1, an internal combustion engine 10 mounted on a vehicle is a bi-fuel internal combustion engine capable of using compressed natural gas (CNG), which is one example of gas fuel, and liquid fuel, or gasoline, which is an alternative fuel for CNG. That is, gasoline corresponds to energy other than CNG.

The internal combustion engine 10 has an intake passage 11, in which CNG injectors 12 and gasoline injectors 13 are provided. In the intake passage 11, air-fuel mixture is produced from intake air and fuel injected into the intake passage 11 by the CNG injectors 12 or the gasoline injectors 13. The air-fuel mixture is drawn into a combustion chamber 15 in a cylinder 14 and combusted. Then, exhaust is discharged to the exhaust passage 16 from the combustion chamber 15.

A fuel supply device 20 will now be described. The fuel supply device 20 includes a gasoline supply system 30 for supplying gasoline stored in a gasoline tank 31 and a CNG supply system 40 for supplying high-pressure CNG stored in a CNG tank 41.

The gasoline supply system 30 includes a fuel pump 32 and a gasoline delivery pipe 33. The fuel pump 32 draws gasoline from the gasoline tank 31. The gasoline delivery pipe 33 receives fuel discharged under pressure by the fuel pump 32. The gasoline injectors 13, the number of which is equal to the number of the cylinders of the engine 10, are coupled to the gasoline delivery pipe 33. The gasoline injectors 13 are configured to inject gasoline supplied through the gasoline delivery pipe 33 into the intake passage 11.

The CNG supply system 40 includes a high pressure fuel pipe 42 and a CNG delivery pipe 43. The CNG supply system 40 is a supply passage for gas fuel that is connected to the CNG tank 41. The CNG delivery pipe 43 is connected to the downstream end (the right end as viewed in FIG. 1) of the high pressure fuel pipe 42. A manual on-off valve 44, which is opened and closed manually, is provided between the CNG tank 41 and the high pressure fuel pipe 42. The control apparatus 50, which functions as the vehicle control apparatus, cannot directly detect whether the manual on-off valve 44 is open or closed.

A shutoff valve 45 is provided in a section of the high pressure fuel pipe 42 that is downstream of the manual on-off valve 44. The shutoff valve 45 is opened or closed through control by the control apparatus 50. When the manual on-off valve 44 and the shutoff valve 45 are both open, CNG is allowed to flow from the CNG tank 41 to the high pressure fuel pipe 42. In contrast, when at least one of the manual on-off valve 44 and the shutoff valve 45 is closed, CNG is inhibited from flowing from the CNG tank 41 to the high pressure fuel pipe 42.

A regulator 46 is provided in a section of the high pressure fuel pipe 42 that is downstream of the shutoff valve 45. The regulator 46 lowers the pressure of CNG supplied from the CNG tank 41 to a predetermined pressure. The CNG, the pressure of which has been lowered to the predetermined pressure, is supplied to the CNG delivery pipe 43. The CNG injectors 12, the number of which is equal to the number of the cylinders of the engine 10, are coupled to the CNG delivery pipe 43. The CNG injectors 12 are configured to inject CNG supplied through the CNG delivery pipe 43 into the intake passage 11.

The CNG supply system 40 includes a pressure sensor SE1 located in a section of the high pressure fuel pipe 42 that is downstream of the shutoff valve 45. The pressure sensor SE1 detects pressure Pa in the high pressure fuel pipe 42. The pressure sensor SE1 is electrically connected to the control apparatus 50. The pressure Pa in the high pressure fuel pipe 42 corresponds to the pressure in the supply passage.

The control apparatus 50 includes a microcomputer constituted by electronic components such as a CPU, a ROM, and a RAM. The control apparatus 50 switches between CNG and gasoline as fuel used for engine operation. Specifically, when a first mode, in which the vehicle travels through CNG-powered engine operation, is selected, the control apparatus 50 opens the shutoff valve 45 in the CNG supply system 40, thereby causing the CNG injectors 12 to inject CNG. In contrast, when a second mode, in which the vehicle travels through gasoline-powered engine operation, is selected, the control apparatus 50 activates the gasoline supply system 30, thereby causing the gasoline injectors 13 to inject gasoline. When the second mode is selected, the control apparatus 50 closes the shutoff valve 45 of the CNG supply system 40.

In rare cases, for example, breakage of the high pressure fuel pipe 42 can cause CNG leakage to the outside from the high pressure fuel pipe 42 of the CNG supply system 40. When such CNG leakage is detected, the engine operation is preferably promptly switched from the CNG-powered engine operation to the gasoline-powered engine operation. That is, it is preferable to inhibit selection of the first mode and promptly switch from the first mode to the second mode.

With reference to the flowchart of FIG. 2, a process routine executed by the control apparatus 50 of the present embodiment will be described. The process routine is executed at a predetermined control cycle.

Figure 2:
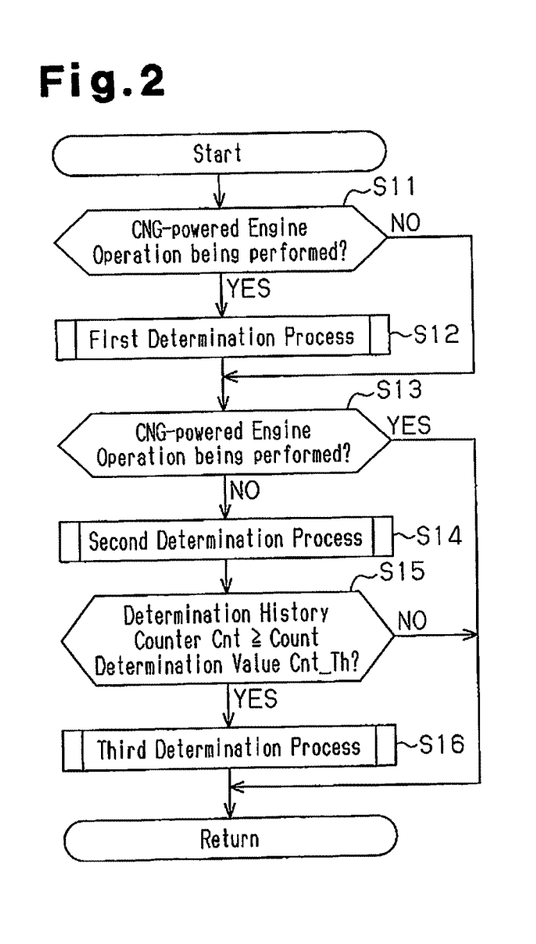
FIG. 2 is a flowchart showing a process routine executed by the vehicle control apparatus of FIG. 1.

As shown in FIG. 2, in this process routine, the control apparatus 50 determines whether the CNG-powered engine operation is being performed (step S11). When the CNG-powered engine operation is not being performed (step S11: NO), the control apparatus 50 proceeds to step S13, which will be discussed below. Cases in which the CNG-powered engine operation is not being performed include, for example, a case in which the gasoline-powered engine operation is being performed, that is, a case in which the second mode is selected, and a case in which the engine is not operating even through the ignition switch is ON.

If the CNG-powered engine operation is being performed (step S11: YES), that is, if the first mode is selected, the control apparatus 50 executes a first determination process, which will be discussed below with reference to FIG. 3 (step S12). The first determination process is a process for determining whether the CNG-powered engine operation should be inhibited. That is, it is determined whether CNG is leaking to the outside from the high pressure fuel pipe 42 during the CNG-powered engine operation. If it is determined that there is a possibility of CNG leakage, the CNG-powered engine operation is inhibited. After executing the first determination process, the control apparatus 50 proceeds to step S13.

In step S13, the control apparatus 50 determines whether the CNG-powered engine operation is being performed. If the CNG-powered engine operation is being performed (step S13: YES), that is, if the first mode is selected, the control apparatus 50 temporarily suspends the current process routine. In contrast, if the CNG-powered engine operation is not being performed (step S13: NO), that is, if the second mode is selected, the control apparatus 50 executes a second determination process, which will be discussed below, by using FIG. 4 (step S14). The second determination process is a process for determining whether inhibition of the CNG-powered engine operation should be continued. That is, it is determined whether CNG is leaking to the outside from the high pressure fuel pipe 42 during inhibition of the CNG-powered engine operation. If it is determined that CNG is leaking to the outside, inhibition of the CNG-powered engine operation is continued.

After executing the second determination process, the control apparatus 50 determines whether a determination history counter Cnt, which will be discussed below, is greater than or equal to a count determination value Cnt_Th, which is a prescribed number (step S15). The count determination value Cnt_Th is set to a number greater than or equal to one (for example, five). If the determination history counter Cnt is less than the count determination value Cnt_Th (step S15: NO), the control apparatus 50 temporarily suspends the current process routine.

If the determination history counter Cnt is greater than or equal to the count determination value Cnt_Th (step S15: YES), the control apparatus 50 executes a third determination process, which will be discussed below, by using FIG. 5 (step S16). The third determination process is a process for determining whether inhibition of the CNG-powered engine operation should be cancelled. That is, the third determination process corresponds to an inhibition cancelling process.

After executing the third determination process, the control apparatus 50 temporarily suspends the current process routine.

With reference to the flowchart of FIG. 3, the first determination process routine of step S12 will now be described.

Figure 3:
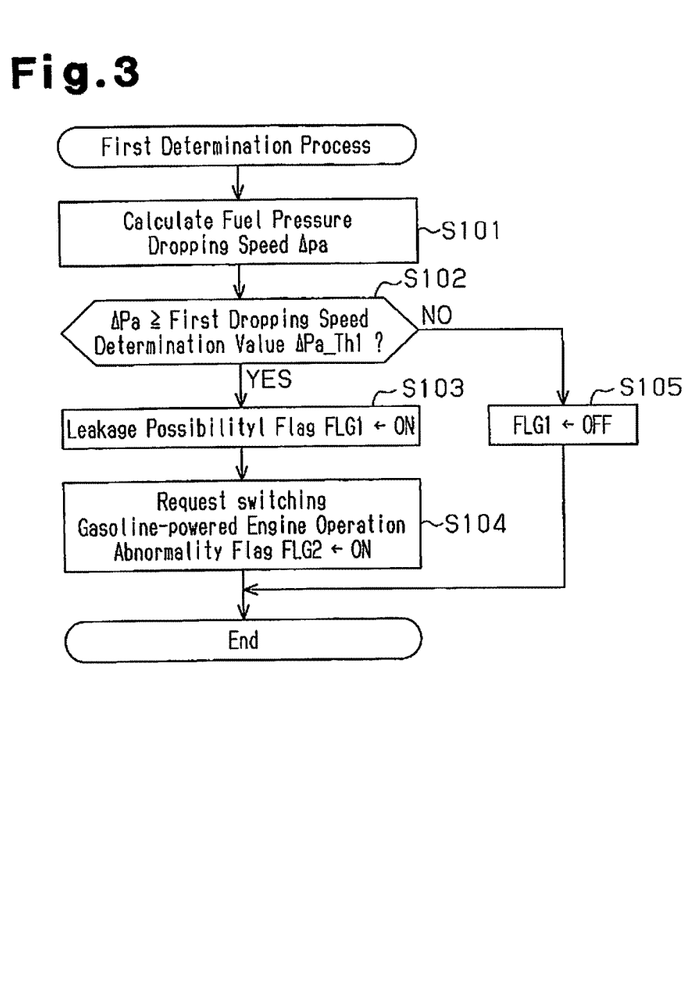
FIG. 3 is a flowchart showing a first determination process routine executed by the vehicle control apparatus of FIG. 1.

As shown in FIG. 3, in this process routine, the control apparatus 50 calculates a fuel pressure dropping speed $\Delta Pa$, which is the speed at which the pressure Pa in the high pressure fuel pipe 42 detected by the pressure sensor SE1 drops (step S101). The fuel pressure dropping speed $\Delta Pa$ has a positive value when the pressure Pa in the high pressure fuel pipe 42 is dropping, and has a negative value when the pressure Pa is rising. The control apparatus 50 determines whether the calculated fuel pressure dropping speed $\Delta Pa$ is greater than or equal to a predetermined first dropping speed determination value $\Delta Pa\_Th1$ (step S102). The first dropping speed determination value $\Delta Pa\_Th1$ corresponds to a first determination speed. That is, in step S102, it is determined whether the pressure Pa in the high pressure fuel pipe 42 is dropping at a speed that is greater than the first determination speed.

When the CNG-powered engine operation is being performed, the pressure Pa in the high pressure fuel pipe 42 gradually drops even if CNG is not leaking to the outside from the high pressure fuel pipe 42. If CNG is leaking to the outside from the high pressure fuel pipe 42, the pressure Pa in the high pressure fuel pipe 42 drops rapidly. That is, during the CNG-powered engine operation, the pressure Pa in the high pressure fuel pipe 42 is monitored, so that it is possible to determine whether there is a possibility of CNG leakage to the outside from the high pressure fuel pipe 42. Accordingly, in the control apparatus 50 of the present embodiment, the first dropping speed determination value $\Delta Pa\_Th1$ is set to a value greater than the fuel pressure dropping speed $\Delta Pa$ during the CNG-powered engine operation without CNG leakage to the outside from the high pressure fuel pipe 42.

If the fuel pressure dropping speed $\Delta Pa$ is greater than or equal to the first dropping speed determination value $\Delta Pa\_Th1$ (step S102: YES), CNG is leaking to the outside from the high pressure fuel pipe 42. In this case, it is determined that there is a possibility of rapid drop of the pressure Pa in the high pressure fuel pipe 42. Therefore, if the fuel pressure dropping speed $\Delta Pa$ is greater than or equal to the first dropping speed determination value $\Delta Pa\_Th1$ (step S102: YES), the control apparatus 50 sets a leakage possibility flag FLG1 to ON (step S103). The leakage possibility flag FLG1 is set to ON when there is a possibility of CNG leakage to the outside from the high pressure fuel pipe 42, and set to OFF when there is no CNG leakage to the outside. Then, the control apparatus 50 executes an inhibition process, in which the control apparatus 50 requests switching from the CNG-powered engine operation to the gasoline-powered engine operation and sets an abnormality flag FLG2 (step S104) to ON, and ends the current process routine. When the abnormality flag FLG2 is ON, the control apparatus 50 inhibits the CNG-powered engine operation continues selecting the second mode.

If the fuel pressure dropping speed $\Delta Pa$ is less than the first dropping speed determination value $\Delta Pa\_Th1$ (step S102: NO), CNG is not leaking to the outside from the high pressure fuel pipe 42. In this case, it is determined that the pressure Pa in the high pressure fuel pipe 42 is gradually dropping. Therefore, if the fuel pressure dropping speed $\Delta Pa$ is less than the first dropping speed determination value $\Delta Pa\_Th1$ (step S102: NO), the control apparatus 50 sets the leakage possibility flag FLG1 to OFF (step S105). Then, the control apparatus 50 ends the current process routine.

With reference to the flowchart of FIG. 4, the second determination process routine of step S14 will now be described.

Figure 4:
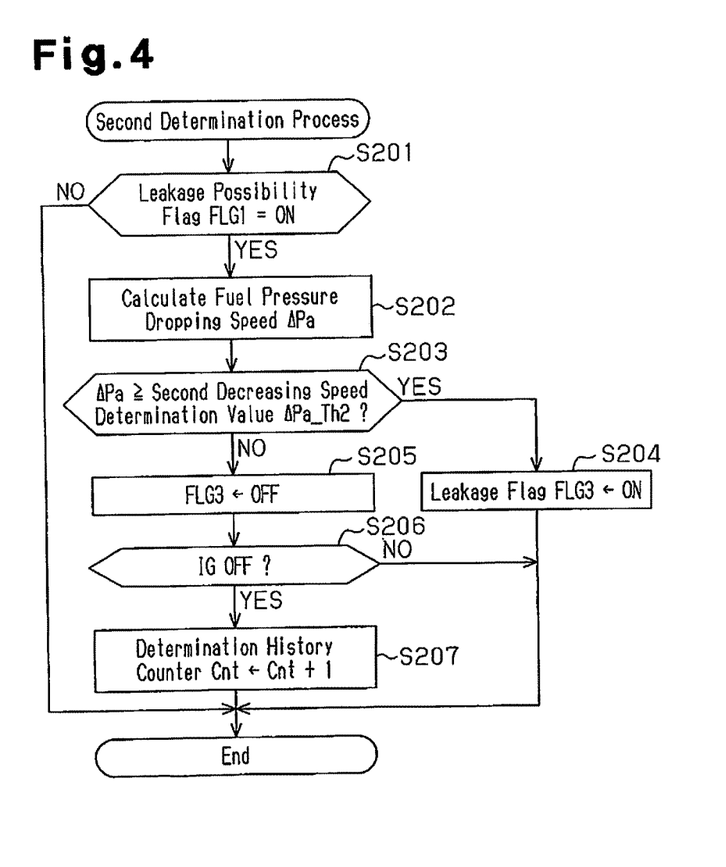
FIG. 4 is a flowchart showing a second determination process routine executed by the vehicle control apparatus of FIG. 1.

As shown in FIG. 4, in this process routine, the control apparatus 50 determines whether the leakage possibility flag FLG1 is ON (step S201). If the leakage possibility flag FLG1 is OFF (step S201: NO), the control apparatus 50 ends the current process routine. If the leakage possibility flag FLG1 is ON (step S201: YES), that is, if there is a possibility of CNG leakage to the outside from the high pressure fuel pipe 42, the control apparatus 50 calculates the fuel pressure dropping speed $\Delta Pa$ in the same manner as the above described step S101 (step S202). Subsequently, the control apparatus 50 determines whether the calculated fuel pressure dropping speed $\Delta Pa$ is greater than or equal to a predetermined second dropping speed determination value $\Delta Pa\_Th2$ (step S203). The second dropping speed determination value $\Delta Pa\_Th2$ corresponds to a second determination speed. That is, in step S202, it is determined whether the pressure Pa in the high pressure fuel pipe 42 is dropping at a speed that is greater than the second determination speed.

Unlike the first determination process, the second determination process is executed in a state in which the CNG-powered engine operation is not performed. Therefore, the second dropping speed determination value $\Delta Pa\_Th2$, which is used for determining whether CNG is leaking to the outside from the high pressure fuel pipe 42, is set to a value smaller than the first dropping speed determination value $\Delta Pa\_Th1$ (but, greater than zero). The second dropping speed determination value $\Delta Pa\_Th2$ may be equal to the first dropping speed determination value $\Delta Pa\_Th1$ or greater than the first dropping speed determination value $\Delta Pa\_Th1$.

The state in which the fuel pressure dropping speed $\Delta Pa$ is greater than or equal to the second dropping speed determination value $\Delta Pa\_Th2$ (step S203: YES) means that a pressure drop in the high pressure fuel pipe 42 is detected even through the CNG-powered engine operation is not being performed. In this case, it is possible to determine that CNG is leaking to the outside from the high pressure fuel pipe 42. Therefore, if the fuel pressure dropping speed $\Delta Pa$ is greater than or equal to the second dropping speed determination value $\Delta Pa\_Th2$ (step S203: YES), the control apparatus 50 sets a leakage flag FLG3 to ON (step S204). The leakage flag FLG3 is set to ON when it is possible to determine that CNG is leaking to the outside from the high pressure fuel pipe 42, and set to OFF when there is a possibility that CNG is not leaking to the outside from the high pressure fuel pipe 42. Then, the control apparatus 50 ends the current process routine. If the leakage flag FLG3 is ON, the control apparatus 50 may execute a process for informing the occupant in the passenger compartment of the CNG leakage.

If the fuel pressure dropping speed $\Delta Pa$ is less than the second dropping speed determination value $\Delta Pa\_Th2$ (step S203: NO), there is a possibility that CNG is not leaking to the outside from the high pressure fuel pipe 42. In this case, the control apparatus 50 sets the leakage flag FLG3 to OFF (step S205). Then, the control apparatus 50 determines whether the ignition switch of the vehicle has been turned off (step S206). If the ignition switch is still on (step S206: NO), the control apparatus 50 ends the current process routine. If the ignition switch is off (step S206:YES), that is, if there is an engine stopping request is made, the control apparatus 50 increments the determination history counter Cnt by one and ends the current process routine (step S207).

In a vehicle having the bi-fuel internal combustion engine 10, turning on the ignition switch starts the engine operation so that the vehicle is drivable. When the ignition switch is turned off, the engine operation is stopped so that the vehicle cannot be driven. That is, the operation for turning the ignition switch on can be referred to as a vehicle traveling starting operation, and the operation for turning the ignition switch off can be referred to as a vehicle traveling ending operation. In this case, the period from when the ignition switch is turned on to when the ignition switch is turned off corresponds to a traveling period.

When the leakage possibility flag FLG1 is ON, the control apparatus 50 of the present embodiment monitors, while the ignition switch is on, whether the fuel pressure dropping speed $\Delta Pa$ is less than the second dropping speed determination value $\Delta Pa\_Th2$. If the leakage flag FLG3 is off when the ignition switch is turned off, that is, if the traveling period ends, CNG leakage to the outside from the high pressure fuel pipe 42 cannot be detected in the current traveling period. The control apparatus 50 thus updates the determination history counter Cnt. That is, if it is determined through the first determination process that there is a possibility of CNG leakage to the outside from the high pressure fuel pipe 42, the control apparatus 50 counts the number of the traveling periods in which it is determined that there is a possibility of no CNG leakage to the outside from the high pressure fuel pipe 42 through the second determination process. The determination history counter Cnt corresponds to the counted number of traveling periods.

With reference to the flowchart of FIG. 5, the third determination process routine of step S16 will now be described.

Figure 5:
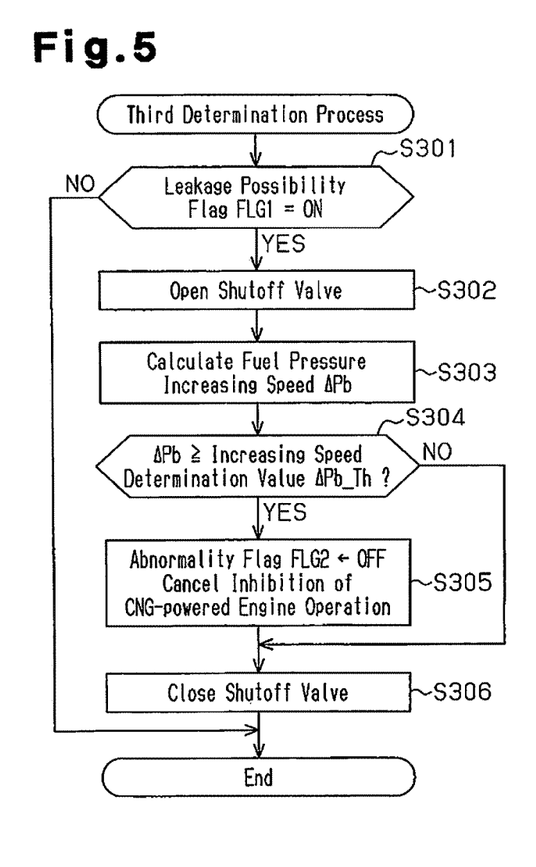
FIG. 5 is a flowchart showing a third determination process routine executed by the vehicle control apparatus of FIG. 1.

As shown in FIG. 5, in this process routine, the control apparatus 50 determines whether the leakage possibility flag FLG1 is ON (step S301). If the leakage possibility flag FLG1 is OFF (step S301: NO), the control apparatus 50 ends the current process routine. If the leakage possibility flag FLG1 is ON (step S301: YES), the control apparatus 50 opens the shutoff valve 45 (step S302). The control apparatus 50 the calculates a fuel pressure increasing speed $\Delta Pb$, which is a speed at which the pressure Pa in the high pressure fuel pipe 42 increases after the shutoff valve 45 is opened (step S303). The fuel pressure increasing speed $\Delta Pb$ has a positive value when the pressure in the high pressure fuel pipe 42 is increased by opening the shutoff valve 45. Subsequently, the control apparatus 50 determines whether the calculated fuel pressure increasing speed $\Delta Pb$ is greater than a predetermined increasing speed determination value $\Delta Pb\_Th$ (step S304).

In a case in which the gasoline-powered engine operation is being performed due to determination that there is a possibility of CNG leakage to the outside from the high pressure fuel pipe 42 through the first determination process executed during the CNG-powered engine operation, the pressure Pa in the high pressure fuel pipe 42 is lower than the pressure in the CNG tank 41. Therefore, when the shutoff valve 45 is opened while the manual on-off valve 44 is open, CNG flows from the CNG tank 41 into the high pressure fuel pipe 42, which raises the pressure Pa in the high pressure fuel pipe 42. That is, the pressure Pa in the high pressure fuel pipe 42 becomes substantially equal to the pressure in the CNG tank 41. Therefore, when the fuel pressure increasing speed Pb is greater than the increasing speed determination value $\Delta Pb\_Th$, it is possible to determine that the manual on-off valve 44 is open. In contrast, when the fuel pressure increasing speed $\Delta Pb$ is less than or equal to the increasing speed determination value ΔPb_Th, it is possible to determine that the manual on-off valve 44 is closed.

If the fuel pressure increasing speed ΔPb is less than or equal to the increasing speed determination value ΔPb_Th (step S304: NO), that is, if has not been detected that the manual on-off valve 44 is open, the control apparatus 50 proceeds to step S306, which will be discussed below. If the fuel pressure increasing speed ΔPb is greater than the increasing speed determination value ΔPb_Th (step S304: YES), that is, if the manual on-off valve 44 is detected to be open, the control apparatus 50 sets the abnormality flag FLG2 to OFF, thereby cancelling inhibition of the CNG-powered engine operation (step S305). The control apparatus 50 then proceeds to step S306.

In step S306, the control apparatus 50 closes the shutoff valve 45, since the gasoline-powered engine operation is being performed. Thereafter, the control apparatus 50 ends the current process routine.

With reference to the timing charts of FIG. 6A to 6C, operation will be described in which CNG leakage to the outside from the high pressure fuel pipe 42 occurs during the CNG-powered engine operation.

Figure 6A:
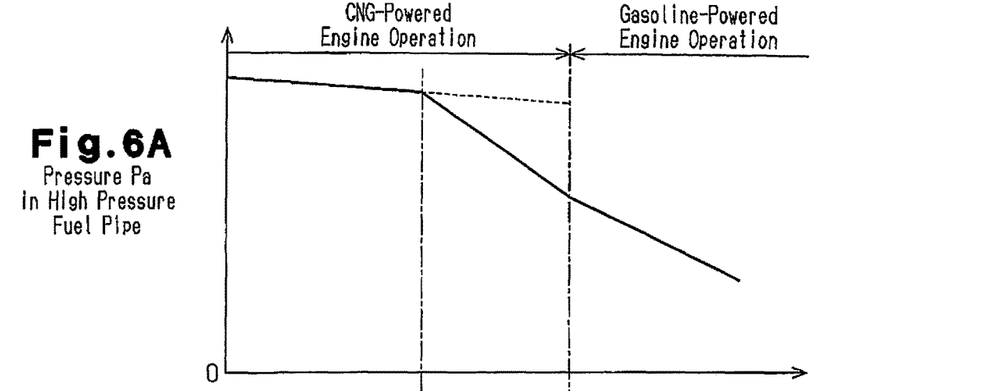
FIG. 6A is a timing chart showing changes in pressure in a high pressure fuel pipe in a case in which leakage to the outside from a CNG pipe during CNG-powered engine operation.
Figure 6B:
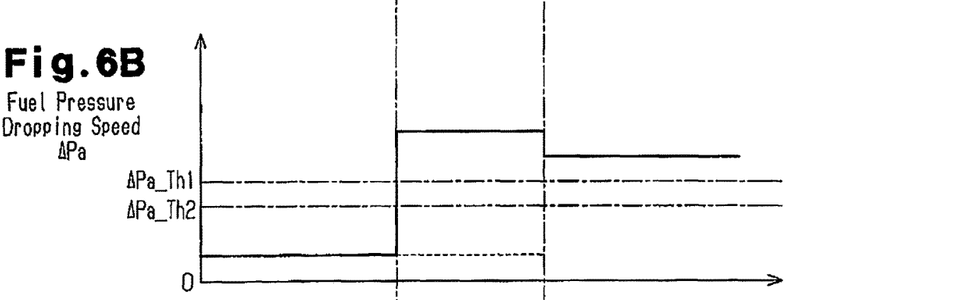
FIG. 6B is a timing chart showing changes in the speed at which fuel pressure drops.
Figure 6C:
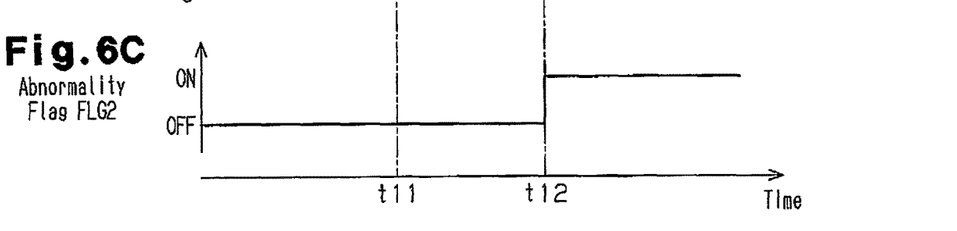
FIG. 6C is a timing chart showing changes in the ON/OFF state of an abnormality flag.

As shown in FIGS. 6A to 6C, when the CNG-powered engine operation is being performed without CNG leakage to the outside from the high pressure fuel pipe 42, the pressure in the CNG tank 41 gradually drops. Accordingly, the pressure Pa in the high pressure fuel pipe 42 drops gradually. At this time, the fuel pressure dropping speed ΔPa, which is the speed at which the pressure Pa in the high pressure fuel pipe 42 drops, is less than the first dropping speed determination value ΔPa_Th1. The abnormality flag FLG2 therefore remains OFF.

However, when CNG leakage to the outside from the high pressure fuel pipe 42 occurs at first point in time t11, the pressure Pa in the high pressure fuel pipe 42 rapidly drops. That is, the fuel pressure dropping speed ΔPa increases. When the first determination process is executed at second point in time t12, it is determined that there is a possibility of CNG leakage to the outside from the high pressure fuel pipe 42 since the fuel pressure dropping speed ΔPa is greater than the first dropping speed determination value ΔPa_Th1. As a result, the abnormality flag FLG2 is set to OFF, and the CNG-powered engine operation is inhibited.

Then the engine operation is switched from the CNG-powered engine operation to the gasoline-powered engine operation. That is, selection of the first mode is inhibited and the mode is switched from the first mode to the second mode. When the gasoline-powered engine operation is started in this manner, the shutoff valve 45 in the high pressure fuel pipe 42 is closed. However, in this case, since CNG is leaking to the outside from the high pressure fuel pipe 42, the fuel pressure dropping speed ΔPa is greater than the second dropping speed determination value ΔPa_Th2 even if the second determination process is executed under the gasoline-powered engine operation. Thus, the inhibition of the CNG-powered engine operation is continued based on the result of the second determination process, and only the gasoline-powered engine operation is permitted.

With reference to the timing charts of FIGS. 7A to 7C, operation will be described in which the CNG-powered engine operation is performed with the manual on-off valve 44 closed.

Figure 7A:
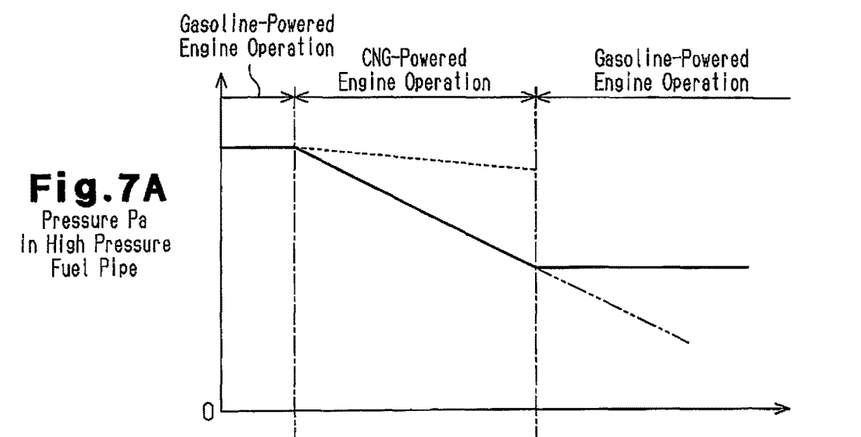
FIG. 7A is a timing chart showing changes in pressure in the high pressure fuel pipe in a case in which the manual on-off valve is closed.
Figure 7B:
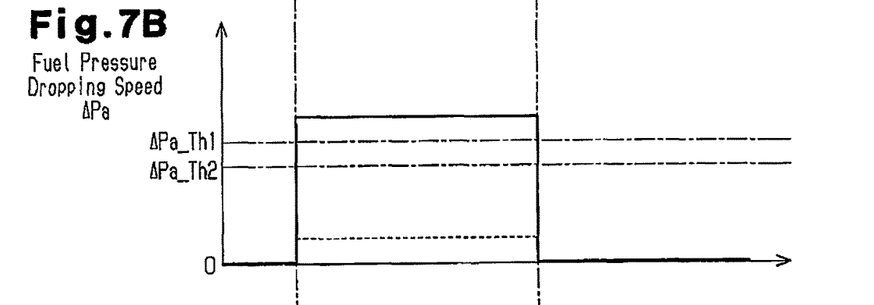
FIG. 7B is a timing chart showing changes in the speed at which fuel pressure drops.
Figure 7C:
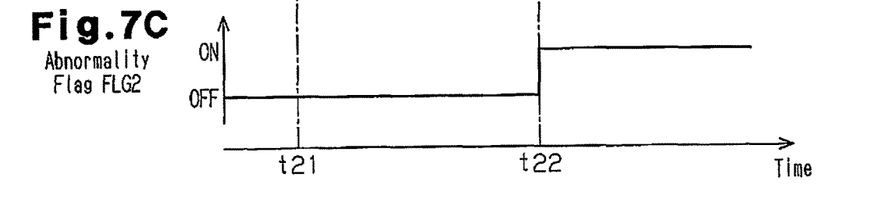
FIG. 7C is a timing chart showing changes in the ON/OFF state of an abnormality flag.
Figure 8A:
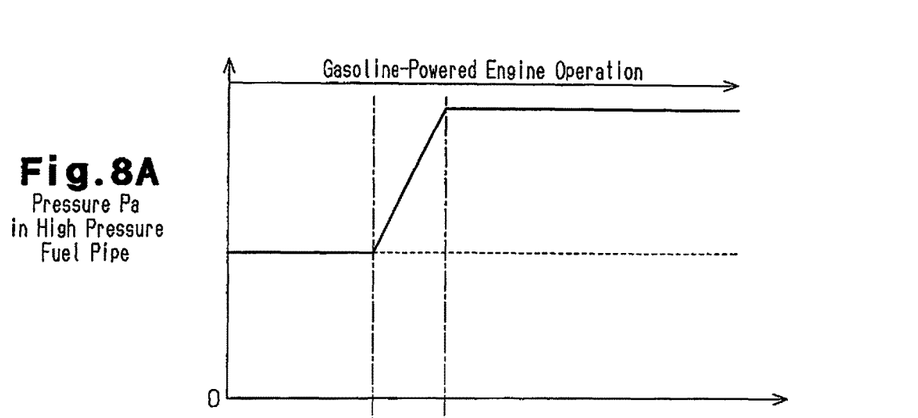
FIG. 8A is a timing chart showing changes in pressure in the high pressure fuel pipe in a case in which the third determination process is being executed during gasoline-powered engine operation.
Figure 8B:
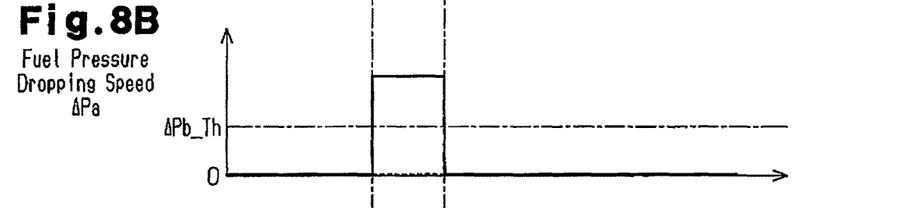
FIG. 8B is a timing chart showing changes in speed at which fuel pressure increases.
Figure 8C:
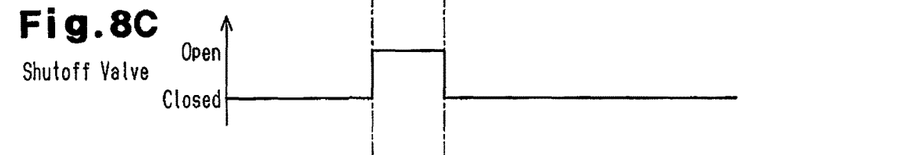
FIG. 8C is a timing chart showing changes in the opening-closing state of the shutoff valve.
Figure 8D:
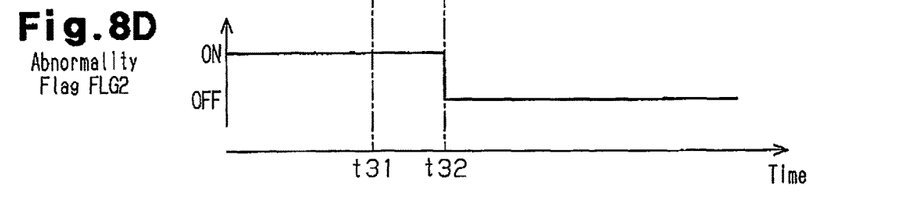
FIG. 8D is a timing chart showing changes in the ON/OFF state of an abnormality flag.

As shown in FIGS. 7A to 7C, there is no leakage to the outside from the high pressure fuel pipe 42 when the gasoline-powered engine operation is performed. The pressure Pa in the high pressure fuel pipe 42 is therefore not changed. As a result, the fuel pressure dropping speed ΔPa is zero. When the engine operation is switched from the gasoline-powered engine operation to the CNG-powered engine operation at first point in time t21, that is, when the mode is changed from the second mode to the first mode, the shutoff valve 45 in the high pressure fuel pipe 42 is opened.

When the CNG-powered engine operation is started at the first point in time t21, CNG does not flow into the high pressure fuel pipe 42 from the CNG tank 41 since the manual on-off valve 44 is closed. Thus, although CNG is not leaking to the outside from the high pressure fuel pipe 42, the pressure Pa in the high pressure fuel pipe 42 drops rapidly.

When the first determination process is executed at second point in time t22, it is determined that there is a possibility of CNG leakage to the outside from the high pressure fuel pipe 42 since the fuel pressure dropping speed ΔPa is greater than the first dropping speed determination value ΔPa_Th1. As a result, the abnormality flag FLG2 is set to OFF, and the CNG-powered engine operation is inhibited. Then the engine operation is switched from the CNG-powered engine operation to the gasoline-powered engine operation. That is, selection of the first mode is inhibited and the mode is switched from the first mode to the second mode. When the gasoline-powered engine operation is started in this manner, the shutoff valve 45 in the high pressure fuel pipe 42 is closed. In this case, the manual on-off valve 44 is simply closed and there is no CNG leakage to the outside from the high pressure fuel pipe 42. Thus, the pressure Pa in the high pressure fuel pipe 42 is maintained at the pressure at second point in time t22. That is, the fuel pressure dropping speed ΔPa is zero.

When the second determination process is performed under the gasoline-powered engine operation, the fuel pressure dropping speed ΔPa is less than the second dropping speed determination value ΔPa_Th2. The leakage flag FLG3 is therefore set to OFF. Thereafter, when the ignition switch is turned off and the current traveling period is ended, the determination history counter Cnt is incremented by one since the leakage flag FLG3 is FF.

Next, with reference to the timing charts of FIGS. 8A to 8D, operation will be described in which the gasoline-powered engine operation is performed with the determination history counter Cnt being greater than or equal to the count determination value Cnt_Th. It is assumed that there is no CNG leakage to the outside from the high pressure fuel pipe 42 and that the manual on-off valve 44 has been opened between the previous traveling period and the current traveling period.

As shown in FIGS. 8A to 8D, the pressure Pa in the high pressure fuel pipe 42 is not changed since CNG is not consumed by the engine 10 during the gasoline-powered engine operation. That is, the fuel pressure increasing speed ΔPb, which is the speed at which the pressure Pa in the high pressure fuel pipe 42 increases, is zero. When the third determination process is performed at first point in time t31, the shutoff valve 45 in the high pressure fuel pipe 42 is opened. Then, since the manual on-off valve 44 is open, CNG flows from the CNG tank 41 into the high pressure fuel pipe 42, which raises the pressure Pa in the high pressure fuel pipe 42. Ultimately, the pressure Pa in the high pressure fuel pipe 42 is raised to a value that slightly lower than the pressure in the CNG tank 41.

Then, the shutoff valve 45 is opened so that the fuel pressure increasing speed ΔPb exceeds the increasing speed determination value ΔPb_Th. Therefore, at point in time t32, the abnormality flag FLG2 is set to OFF, and inhibition of the CNG-powered engine operation is cancelled. That is, the inhibition of selection the first mode is cancelled. Thus, even if the CNG-powered engine operation is performed with the manual on-off valve 44 closed and the CNG-powered engine operation is inhibited, the inhibition of the CNG-powered engine operation can be cancelled if the manual on-off valve 44 is detected to be open.

The above described configuration and operation have the following advantages.

(1) When the first determination process is executed during the CNG-powered engine operation, and the fuel pressure dropping speed $\Delta Pa$ is greater than or equal to the first dropping speed determination value $\Delta Pa\_Th1$, there is a possibility of CNG leakage to the outside from the high pressure fuel pipe 42. Therefore, the CNG-powered engine operation is inhibited, and the gasoline-powered engine operation is started. In this manner, execution of the first determination process during the CNG-powered engine operation allows the CNG-powered engine operation to be promptly ended if there is a possibility of CNG leakage to the outside from the high pressure fuel pipe 42.

(2) However, even when there is no CNG leakage to the outside from the high pressure fuel pipe 42, the first determination process executed during the CNG-powered engine operation may erroneously determine, in some cases, that there is a possibility of CNG leakage to the outside from the high pressure fuel pipe 42 if the manual on-off valve 44 is closed. Therefore, the control apparatus 50 of the present embodiment executes the second determination process when the gasoline-powered engine operation is performed with the CNG-powered engine operation inhibited. Since it is possible to determine that there is CNG leakage to the outside from the high pressure fuel pipe 42 when the fuel pressure dropping speed $\Delta Pa$ is greater than or equal to the second dropping speed determination value $\Delta Pa\_Th2$, the inhibition of the CNG-powered engine operation is continued. In this case, the internal combustion engine 10 is driven by supply of gasoline. Therefore, the CNG-powered engine operation is promptly inhibited when there is CNG leakage to the outside from the high pressure fuel pipe 42.

(3) When it is determined through the second determination process that the fuel pressure dropping speed $\Delta Pa$ is greater than or equal to the second dropping speed determination value $\Delta Pa\_Th2$, the manual on-off valve 44 is simply closed and it can be determined that there is a possibility of no CNG leakage to the outside from the high pressure fuel pipe 42. In such a case, the shutoff valve 45 is opened through the third determination process, and it is determined whether the pressure Pa in the high pressure fuel pipe 42 is raised by opening the shutoff valve 45. If the pressure Pa in the high pressure fuel pipe 42 is raised by opening the shutoff valve 45, it is possible to determine that the manual on-off valve 44 is open, and the inhibition of the CNG-powered engine operation is cancelled. Hence, when there is actually no CNG leakage to the outside from the high pressure fuel pipe 42, but the manual on-off valve 44 is simply closed, the CNG-powered engine operation can be performed by opening the manual on-off valve 44.

(4) However, the manual on-off valve 44 is usually opened by the user when the engine is not operating, and rarely opened during engine operation. Therefore, when it is determined in the second determination process that there is no CNG leakage to the outside from the high pressure fuel pipe 42, and that the manual on-off valve 44 is simply closed, the third determination process executed after the engine is stopped. This increases the likelihood that the third determination process will be executed after the manual on-off valve 44 is opened. Execution of the third determination process therefore allows the inhibition of the CNG-powered engine operation to be easily cancelled.

(5) It is preferable to cancel the inhibition of the CNG-powered engine operation only when it is determined that there is no CNG leakage to the outside from the high pressure fuel pipe 42. In this regard, the control apparatus 50 of the present embodiment counts the number of the traveling periods in which the fuel pressure dropping speed $\Delta Pa$ is determined to be less than the second dropping speed determination value $\Delta Pa\_Th2$. When the number reaches the prescribed number, that is, when the determination history counter Cnt reaches the count determination value Cnt_Th, the third determination process is executed. Accordingly, when it is reliably determined that there is no CNG leakage to the outside from the high pressure fuel pipe 42 and the manual on-off valve is open, the inhibition of the CNG-powered engine operation can be cancelled.

The above described embodiment may be modified as follows.

In the flow chart of FIG. 2, the determination process of step S15 may be omitted. In this case, if it is determined through the second determination process that the fuel pressure dropping speed $\Delta Pa$ is greater than or equal to the second dropping speed determination value $\Delta Pa\_Th2$, the third determination process is executed regardless of the determination history counter Cnt.

In place of the determination process of step S15, time during which the fuel pressure dropping speed $\Delta Pa$ is greater than or equal to the second dropping speed determination value $\Delta Pa\_Th2$ may be measured, and the third determination process may be executed when the measured time reaches a predetermined time.

The third determination process may be executed after the vehicle is started after the vehicle is stopped in a state in which it is determined in the second determination process that the fuel pressure dropping speed $\Delta Pa$ is less than the second dropping speed determination value $\Delta Pa\_Th2$. In this case, if the manual on-off valve 44 is opened while the vehicle is in a stopped state, the third determination process will be executed in the subsequent traveling of the vehicle. This allows the inhibition of the CNG-powered engine operation to be cancelled. The stopped state herein includes not only a state in which the vehicle is stopped with the engine stopped, but also the vehicle is stopped with the engine operating.

The first dropping speed determination value $\Delta Pa\_Th1$ does not necessarily need to be a previously determined value, but may be varied in accordance with the manner in the CNG-powered engine operation is performed at the time. In this case, the greater the amount of CNG consumed by the engine operation at the time, the greater the first dropping speed determination value $\Delta Pa\_Th1$ is set.

When the shutoff valve 45 is closed and CNG is leaking to the outside from the high pressure fuel pipe 42, the pressure Pa remains substantially unchanged after dropping to a value close the atmospheric pressure. In this case, even if CNG leaks from the high pressure fuel pipe 42, there is a possibility that the fuel pressure dropping speed $\Delta Pa$ will be less than the second dropping speed determination value $\Delta Pa\_Th2$, and the determination history counter Cnt will be updated. Thus, when the pressure Pa in the high pressure fuel pipe 42 is less than a determination value that is slightly higher than the atmospheric pressure, the third determination process does not need to be executed. In this case, step S302 and the subsequent process is prevented from being executed if CNG is leaking from the high pressure fuel pipe 42.

The gas fuel may be any gas fuel other than CNG (for example, hydrogen gas). For example, when the gas fuel is hydrogen gas, the liquid fuel may be gasoline. Further, when the gas fuel is dimethyl ether (DME), the liquid fuel may be light oil.

As long as the internal combustion engine 10 can be driven with CNG, the engine 10 does not necessary need to be a bi-fuel internal combustion engine. In this case, the vehicle may be a hybrid vehicle, which has, as a power source other than the internal combustion engine, a motor driven with electric energy, which is one example of energy other than gas fuel. In this case, a mode in which the engine is stopped and the vehicle is driven by the motor corresponds to the second mode. The second determination process and the third determination process may be executed when the vehicle is traveling using the motor.

Therefore, the present examples and embodiments are to be considered as illustrative and not restrictive and the invention is not to be limited to the details given herein, but may be modified within the scope and equivalence of the appended claims.

The invention claimed is:

1. A vehicle control apparatus that is applicable to a vehicle having a first mode, in which only gas fuel is supplied to an internal combustion engine to drive the vehicle, and a second mode, in which the vehicle is driven by energy other than gas fuel, wherein
the vehicle control apparatus is configured, when the first mode is selected, to supply gas fuel to the engine a supply passage for gas fuel, in which a manual on-off valve and a shutoff valve are arranged, the shutoff valve being downstream of the manual on-off valve, the control apparatus being arranged to open the shutoff valve when the first mode is selected so as to allow supply of gas fuel to the internal combustion engine, and the control apparatus being arranged to close the shutoff valve when the second mode is selected so as to block supply of gas fuel to the internal combustion engine,
if a pressure in the supply passage drops at a speed greater than a first determination speed in a state in which the first mode is selected, the control apparatus inhibits selection of the first node and switches from the first mode to the second mode,
if the pressure in the supply passage drops at a speed greater than a second determination speed in a state in which the second mode is selected due to inhibition of selection of the first mode, the control apparatus maintains the state in which the second mode is selected,
if the pressure in the supply passage drops at a speed lower than the second determination speed in a state in which the second mode is selected due to inhibition of selection of the first mode, the control apparatus cancels the inhibition of selection of the first mode when it is detected that the manual on-off valve is opened, and
when the pressure in the supply passage is raised by opening the shutoff valve, it is determined that the manual on-off valve is opened, and the control apparatus cancels the inhibition of selection of the first mode.

2. The vehicle control apparatus according to claim 1, wherein if the pressure in the supply passage drops at a speed lower than the second determination speed in a state in which the second mode is selected due to inhibition of selection of the first mode, the control apparatus executes an inhibition cancelling process, in which the control apparatus opens the shutoff valve and cancels the inhibition of selection of the first mode when the pressure in the supply passage is raised by opening the shutoff valve.

3. The vehicle control apparatus according to claim 2, wherein, if the control apparatus detects that the pressure in the supply passage drops at a speed lower than the second determination speed in a state in which the second mode is selected due to inhibition of selection of the first mode, the control apparatus executes the inhibition cancelling process during traveling of the vehicle in the second mode after the vehicle is stopped.

4. The vehicle control apparatus according to claim 2, wherein
a period from when a vehicle traveling starting operation is performed to when a vehicle traveling ending operation is performed is defined as a traveling period,
the control apparatus counts traveling periods in which it is determined that the pressure in the supply passage drops at a speed lower than the second determination speed in a state in which the second mode is selected due to inhibition of selection of the first mode, and
the control apparatus executes the inhibition cancelling process in a traveling period in which the count is greater than or equal to a prescribed number.

5. The vehicle control apparatus according to claim 1, wherein
the internal combustion engine is a bi-fuel internal combustion engine, which is also operated when supplied with liquid fuel, and
the second mode is a mode in which the vehicle is driven by supplying liquid fuel to the engine.

6. A vehicle control method that is applicable to a vehicle having a first mode, in which only gas fuel is supplied to an internal combustion engine to drive the vehicle, and a second mode, in which the vehicle is driven by energy other than gas fuel, wherein the vehicle control method is configured, when the first mode is selected, to supply gas fuel to the engine via a supply passage, the supply passage having a manual on-off valve and a shutoff valve arranged therein, the method comprising:
a step in which, if a pressure in the supply passage drops at a speed greater than a first determination speed in a state in which the first mode is selected, selection of the first mode is inhibited, the shutoff valve is closed so as to block supply of gas fuel to the engine, and the first mode is switched to the second mode;
a step in which, if the pressure in the supply passage drops at a speed greater than a second determination speed in a state in which the second mode is selected due to inhibition of selection of the first mode, the state in which the second mode is selected is maintained,
a step in which, if the pressure in the supply passage drops at a speed lower than the second determination speed in a state in which the second mode is selected due to inhibition of selection of the first mode, the inhibition of selection of the first mode is canceled when it is detected that the manual on-off valve is opened, and the shutoff valve is opened to allow supply of gas fuel to the engine, and
a step in winch, when the pressure in the supply passage is raised by operating the shutoff valve, it is determined that the manual on-off valve is opened, then the inhibition of selection of the first mode is canceled.

7. The vehicle control method according to claim 6, further comprising a step in which, if the pressure in the supply passage drops at a speed lower than the second determination speed in a state in which the second mode is selected due to inhibition of selection of the first mode, the shutoff valve is opened and the inhibition of selection of the first mode is canceled when the pressure in the supply passage is raised by opening the shutoff valve.

\* \* \* \* \*